United States Patent [19]

Roberts et al.

[11] Patent Number: 4,692,623

[45] Date of Patent: Sep. 8, 1987

[54] PRECISION LASER BEAM POSITIONER AND SPATIALLY RESOLVED LASER BEAM SAMPLING METER

[75] Inventors: Thomas G. Roberts, Huntsville; Raymond W. Conrad, Russellville; William F. Otto, Huntsville; Thomas E. Honeycutt, Somerville, all of Ala.

[73] Assignee: The United States of America as represented by the Secretary of the Army, Washington, D.C.

[21] Appl. No.: 835,826

[22] Filed: Feb. 13, 1986

[51] Int. Cl.[4] ............................................. G01K 17/00
[52] U.S. Cl. ........................................ 250/349; 374/32
[58] Field of Search ................. 374/32; 250/349, 336.1

[56] References Cited

U.S. PATENT DOCUMENTS

| 2,504,965 | 4/1950 | Davis | 323/365 X |
| 3,153,343 | 10/1964 | Barnes | 250/352 X |
| 4,012,955 | 3/1977 | Szente | 374/32 |
| 4,301,680 | 11/1981 | Lunev et al. | 374/32 |

FOREIGN PATENT DOCUMENTS

| 1394798 | 1/1964 | France | 374/32 |
| 0082422 | 7/1981 | Japan | 374/115 |
| 0106884 | 7/1982 | Japan | 250/349 |
| 0457111 | 11/1936 | United Kingdom | 374/115 |
| 2082009 | 2/1982 | United Kingdom | 250/349 |
| 0136070 | 12/1959 | U.S.S.R. | 250/349 |

OTHER PUBLICATIONS

"Fast-Response Meter for Measuring the Power of Carbon Dioxide Laser Radiation", Kuz'michev et al., Sov. J. Quant. Electron, vol. 4, No. 11, May 1975, pp. 1337-1339.

Primary Examiner—Daniel M. Yasich
Attorney, Agent, or Firm—Freddie M. Bush; Robert C. Sims

[57] ABSTRACT

The meter consists of wire resistors arranged so as to sample the energy in a laser beam at different locations in the beam. Each resistor is part of a bridge which includes three other resistors, a power source, a detector (volt meter) and a display unit which may be a recorder. One of the three additional resistors may be an additional set of wires which are made nearly identical to the set being used to sense the laser beam's position or to determine its intensity distribution. When the wire resistors are exposed to the laser beam the wires are heated, their resistance changes, and the various bridges become unbalanced. The magnitude of the voltage produced in each bridge is proportional to the energy in the laser pulse at the location of each wire.

11 Claims, 7 Drawing Figures

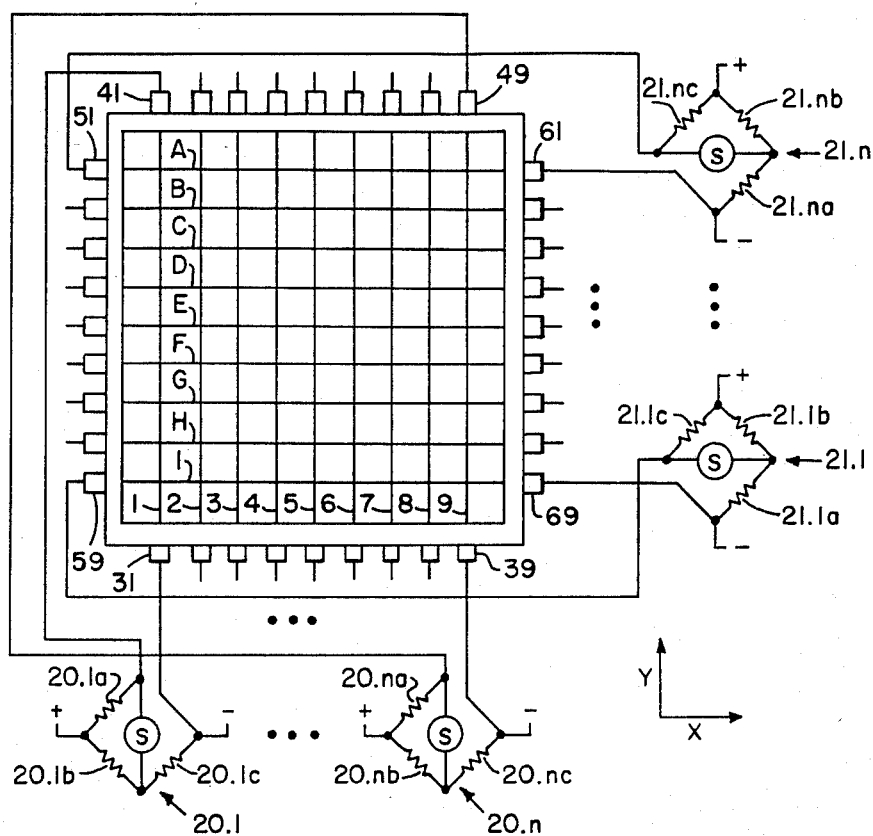
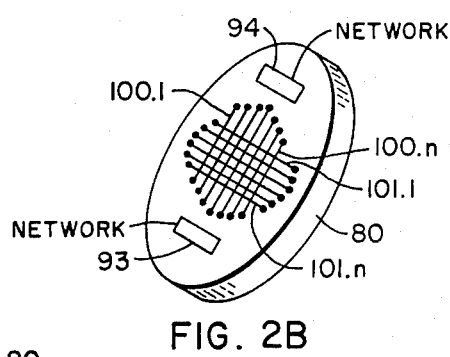
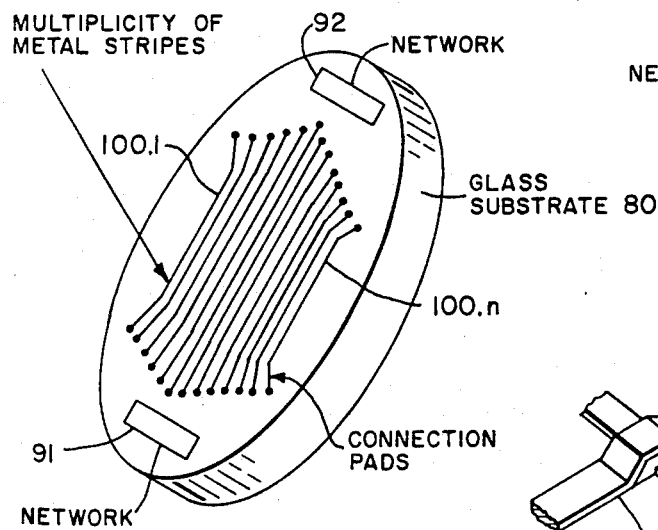
FIG. 1
FIG. 2B
FIG. 2A
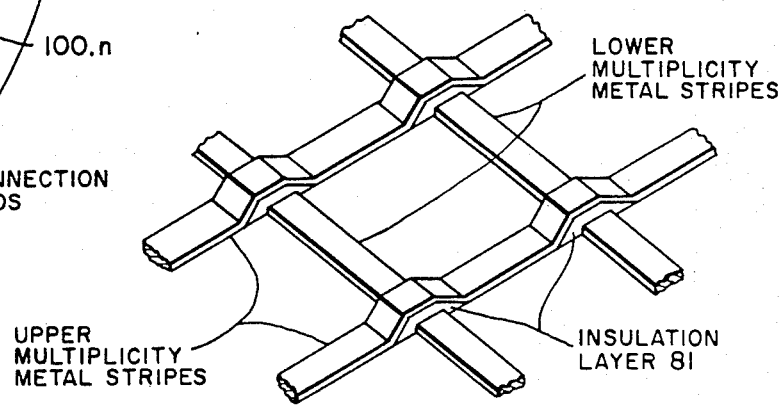
FIG. 2C

PRECISION LASER BEAM POSITIONER AND SPATIALLY RESOLVED LASER BEAM SAMPLING METER

DEDICATORY CLAUSE

The invention described herein may be manufactured, used, and licensed by or for the Government for governmental purposes without the payment to us of any royalties thereon.

BACKGROUND OF THE INVENTION

In most experiments and applications utilizing lasers, it is desried to know the output power as a function of space and time. This could best be accomplished by using an inline power meter which does not obstruct the beam, which does not remove from the beam an appreciable number of photons, which has adequate spatial resolution, and which reads out the power with a response time short enough to indicate fluctuations of interest. Such an ideal device does not currently exist because low energy beams do not produce large enough effects and high energy beams tend to be too destructive. However, several attempts have been made to accomplish positions of this desired result. For example see U.S. Pat. No. 4,167,666, Sept. 11, 1979 (by T. G. Miller, B. O. Rogers, and T. G. Roberts); U.S. Pat. No. 4,035,088, July 12, 1977 and Canadian Pat. No. 1,132,372 (by A. H. Jenkins and J. J. Wachs); U.S. Pat. No. 4,458,496 issued Oct. 22, 1985 (by T. G. Roberts and T. E. Honeycutt); and most recently the work of C. H. Pyles, W. F. Otto, T. E. Honeycutt and T. G. Roberts as disclosed in U.S. patent application Ser. No. 707,294 filed Mar. 1, 1985.

The work of Pyles, et al provided a simple nonobstructing power meter for high energy pulsed lasers. This meter is simple, easy to build, easy to use, and easy to maintain. This device may readily be used either near the laser device to measure the output of the laser or near the target to measure the energy reaching a sample or target. (Such a device has also recently been used with a low power (4 watts) $CO_2$ laser.) The response time of this device is of the order of 100 sec or less, and operates at pulse rates up to several tens per second with no cooling or only moderate cooling such as that produced by a fan. However, the usefulness of this device is limited because it integrates the energy within each laser pulse over both time and space. Thus, one obtains no information about these distributions within a pulse.

It is an object of this disclosure to provide a nonobstructing device which may be used to obtain information on the spatial distribution of the energy in a laser beam. It is a further objective of this disclosure to provide a device that may be used to accurately determine the position of a laser beam.

In many experiments it is necessary to align the laser beam along some desired optical path. This requires one to be able to locate the center of the laser beam with precision. This is currently difficult to accomplish especially in the infrared part of the spectrum. Also, there are many laser applications where the ability to determine with precision the positions of a laser beam would be useful such as in control loops to maintain alignment. An example would be in the use of laser welders, say, on an automobile assembly line. In such an application the device disclosed here could be used to monitor the position, alignment, and power in the laser beam, and still permit the welding action to be accomplished.

SUMMARY OF THE INVENTION

The precision laser beam positioner and spatially resolved beam sampling meter consists of wire resistors arranged so as to sample the energy in a laser beam at different locations in the beam. Each resistor is part of a bridge which includes three other resistors, a power source, a detector (volt meter) and a display unit which may be a recorder. One of the three additional resistors may be an additional set of wires which are made nearly identical to the set being used to sense the laser beam's position or to determine its intensity distribution. When the wire resistors are exposed to the laser beam the wires are heated, their resistance changes, and the various bridges become unbalanced. The magnitude of the voltage produced in each bridge is proportional to the energy in the laser pulse at the location of each wire.

BRIEF DESCRIPTION OF THE DRAWINGS

FIG. 1 is a schematic illustration of the precision laser beam positioner and spatially resolved laser beam sampling meter.

FIGS. 2A, 2B and 2C are schematic illustrations showing method of producing detectors for use with visible wavelengths.

DESCRIPTION OF THE BEST MODE AND PREFERRED EMBODIMENT

Referring to FIG. 1, the precision laser beam positioner and spatially resolved laser beam sampling meter consists of a multiplicity of wires (1, 2, ...) and a second multiplicity of wires (A, B, C, ...) which are positioned perpendicular to the first multiplicity of wires. Both are arranged such that they present a plurality straight line segments each in a single plane and each parallel to the other. These two sets of wires are also positioned one behind the other. The wires are tungsten wires (0.001 inches in diameter), and the number of wires used depends on the precision required. The spacing between the two sets of wires are not critical and is determined by convenience of construction. Each wire constitutes one leg of a resistance bridge 20.1–20.n and 21.1–21.n which are used to determine the change in resistance of this wire when it is exposed to the laser beam. Therefore, if there are n wires in each wire set there will be $2^n$ bridges used to produce the data. Each bridge includes three other resistors sub "a", sub "b" and sub "c". These resistors might each consist of another set of wires constructed so as to be nearly identical to those of the sets (1, 2, 3, ...) and (A, B. C. ...) but this is not necessary. Each bridge is supplied with low voltage DC power, and there is an output voltage from each bridge which is recorded and used to produce the final data. $2^n$ power supplied are not needed, as one or two constant voltage power supplies are sufficient. Each end of the wires are fastened to conducting posts (copper) 31–39, 41–49, 51–59 and 61–69 by the use of a conducting epoxy. The bridge connections are also made to these metal posts. Other techniques for mounting the wires may also be used. The data from each of the horizontal wires (A, B. C. ...) are used to produce a display of the energy in the pulse as a function of Y.

Here the energy has been integrated along X at each Y location by the wire located there. The data from perpendicular wire are used to produce a display of the energy in the pulse as a function of X. In this case the energy has been integrated along Y at each X location by the wire located there. These two sets of data may be processed by an online minicomputer to display the data in several forms including contour plots which are especially useful for laser beam positioning and alignment work.

Figure 4:
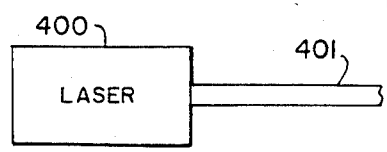
FIG. 4 shows a laser and its beam.

In using this device it is necessary to have some a prior information about the shape of the laser beam that is desired to be characterized. FIG. 4 shows a laser device 400 producing a laser energy beam 401 typically used in this disclosure. This is necessary because we are making only $2^n$ measurements to produce information that normally requires $n^2$ measurements to describe the laser beam uniquely. Thus, in special cases, it is possible for the device disclosed here to produce the same display for two beams that have different spatial energy distributions. Therefore some information about the general shape of the laser beam is necessary in order to properly display the data. However, in most all cases where lasers are used, this information is readily available and its use greatly simplifies the device disclosed here.

The embodiment described above, using wires is primarily for use with high average power pulsed lasers such as $CO_2$ and excimers. An embodiment for use with other lasers such as ion laser where the beams are usually much smaller in spatial extent is described below.

For lasers operating in the near ultraviolet, visible and near infrared regions of the spectrum, the required multiplicities of wires is produced by photolithograph techniques on transparent substrates (see FIGS. 2A-2C). Taking an argon ion laser as an example, a suitable transparent substrate would be glass 80. An array of metal stripes 100.1-100.n could be produced on the surface of the glass substrate 80 by evaporation through a mask or by evaporating a layer of metal over the entire surface and using photolithography to selectively etch away metal between the desired strips (see FIG. 2A). A second, orthogonal multiplicity of strips 101.1-101.n could be produced on the same surface by first evaporating an insulating material 81 through a mask onto the first multiplicity of strips, where the first and second multiplicities intersect, so as to provide electrical isolation between the first and second multiplicities (see FIGS. 2B and 2C). Alternately, the second multiplicity could be produced on the back surface of the glass substrate (which is also illustrated by FIG. 2B). This latter method is much simpler, but it does introduce the possibility of a slight parallax error if the laser beam is incident at other than normal incidence.

The width, thickness, and density of metal stripes may be very accurately controlled using the above procedures. Thus, the sensitivity, resolution and time response may be varied over wide ranges. Typically, an antireflecting coating would be applied over the metal stripes to reduce reflection losses.

The additional resistors required to form the bridge circuits could also be deposited on the glass substrate in the area not exposed to the laser beam as shown by network boxes 91-94 in FIGS. 2A and 2B. This would produce a very compact device. The material used for these additional resistors would be a high resistivity metal, such as Nichrome, so as to permit shorter resistor lengths. The technique described herein may be readily extended to other wavelengths, and other substrates by those skilled in the art.

Figure 3A:
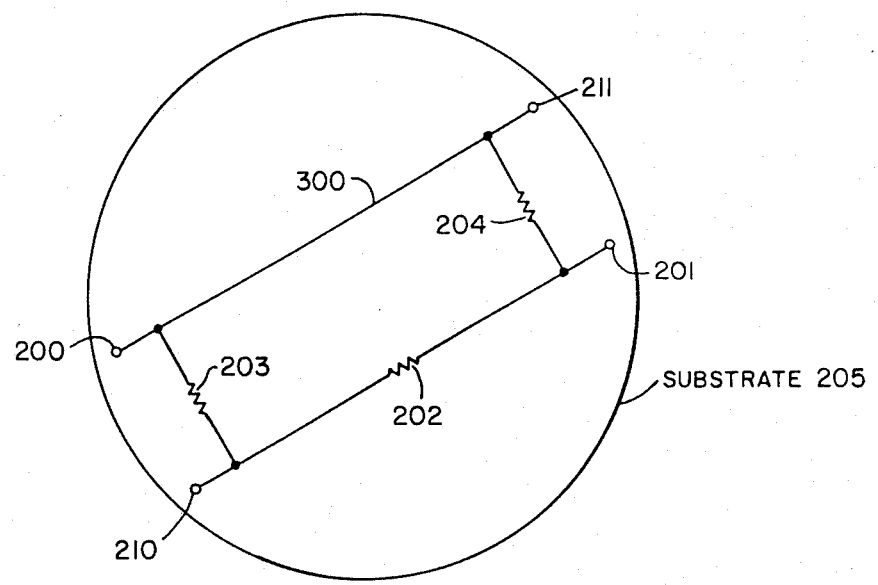
FIGS. 3A and 3B are schematic illustrations showing method of producing bridges for use with visible wavelengths.
Figure 3B:
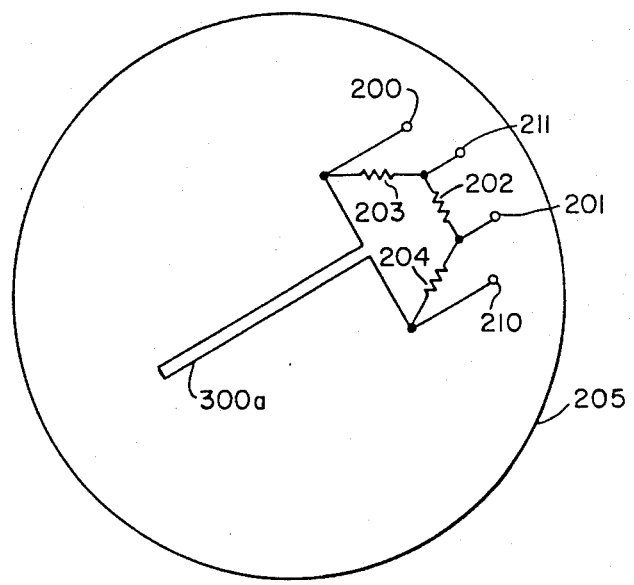

FIG. 3A shows one way the power connections 200 and 201 and bridge resistors 202-204 can be connected to the individual active wire elements 300 on the substrate 205. The signal output of the bridge will be at terminals 210 and 211. By folding wire 300 into wire 300a as shown in FIG. 3, the bridge elements 200-204, 210 and 211 can be neatly placed to the outer rim of substrate 205.

We claim:

1. An analyzer for an energy beam comprising a first set of plurality of wire resistors arranged on a substrate such that they present a plurality of straight line segments each in a horizontal plane and parallel to each other, a second set of plurality of wave resistors located on the substrate positioned behind said first set of wave resistors such that they present a plurality of straight line segments in a plane and parallel to each other, said resistors being positioned on said substrate such that the beam will impinge on at least a portion of said resistors so as to cause heating of said resistors and therefore a change in the resistance in accordance to the power output of the beam and its position relative to said resistors and a plurality of measuring means individually connected to different ones of said wire resistors for measuring the resistance of each resistor.

2. An analyzer as set forth in claim 1 wherein said energy beam is a laser beam.

3. An analyzer as set forth in claim 2 wherein said plurality of measurement means are bridge networks with a different one of said wire resistors as one leg of said bridge.

4. An analyzer as set forth in claim 1, further comprising the second set of plurality of wire resistors arranged on said substrate such that they present the second set of plurality of straight line segments each in a plane, parallel to each other and perpendicular to said first set of resistors and a first and a second set of plurality of measurement means individually connected to different ones of the resistors for measuring the resistance of each resistance.

5. An analyzer as set forth in claim 4 wherein said energy beam is a laser beam.

6. An analyzer as set forth in claim 5 wherein said plurality of measuring means are bridge networks with a different one of said wire resistors as one leg of said bridge.

7. An analyzer as set forth in claim 4 wherein said substrate is a glass substrate and said resistors are metal stripes on a surface of said substrate.

8. An analyzer as set forth in claim 7 wherein said beam is a laser beam with an operating frequency in the near ultraviolet to near infrared range.

9. An analyzer as set forth in claim 8 wherein said measurement means are located on said glass substrate.

10. An analyzer as set forth in claim 1 wherein said substrate is a glass substrate and said plurality of wire resistors are metal stripes on a surface of said substrate.

11. An analyzer as set forth in claim 10 wherein said beam is a laser beam with an operating frequency in the near ultraviolet to near infrared range.

* * * * *